(12) United States Patent
Ketelson et al.

(10) Patent No.: US 12,527,688 B2
(45) Date of Patent: *Jan. 20, 2026

(54) DISSOLVABLE MEDICAL DEVICE FOR DRUGS DELIVERY

(71) Applicant: Alcon Inc., Fribourg (CH)

(72) Inventors: Howard Allen Ketelson, Dallas, TX (US); Rekha Rangarajan, Fort Worth, TX (US)

(73) Assignee: Alcon Inc., Fribourg (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/145,180

(22) Filed: Dec. 22, 2022

(65) Prior Publication Data

US 2023/0201030 A1 Jun. 29, 2023

Related U.S. Application Data

(60) Provisional application No. 63/265,967, filed on Dec. 23, 2021.

(51) Int. Cl.
*A61K 9/00* (2006.01)
*A61F 9/00* (2006.01)
(Continued)

(52) U.S. Cl.
CPC .......... *A61F 9/0017* (2013.01); *A61K 9/0051* (2013.01); *A61K 9/7007* (2013.01);
(Continued)

(58) Field of Classification Search
CPC ............... A61F 9/0017; A61K 9/0051; A61K 9/7007; A61K 31/137; A61K 47/10; A61K 47/32;
(Continued)

(56) References Cited

U.S. PATENT DOCUMENTS 4,730,013 A 3/1988 Bondi et al.
4,946,450 A 8/1990 Erwin
(Continued)

FOREIGN PATENT DOCUMENTS

JP 2017043607 A 3/2017
WO 2020222195 A1 11/2020

OTHER PUBLICATIONS

Chan Wendy et al: "Topical delivery of a Rho-kinase inhibitor to the cornea via mucoadhesive film", European Journal of Pharmaceutical Sciences, Elsevier Amsterdam, NL, vol. 91, May 16, 2016, pp. 256-264.

Paugh et al., "Precorneal Residence Time of Artificial Tears Measured in Dry Eye Subjects", Optometry and Vision Science, Aug. 2008, 85(8), pp. 725-731.

(Continued)

*Primary Examiner* — Bethany P Barham
*Assistant Examiner* — Janet Joseph
(74) *Attorney, Agent, or Firm* — Sheng-Hsin Hu

(57) ABSTRACT

A dissolvable medical device for placing on the outer exposed surface of the eye to deliver a drug to the eye comprises: a polymeric film has sufficient dimensions to cover a cornea when applied to an eye and the polymeric film comprising one or more mucoadhesive polymers. The polymeric film dissolves between 15 minutes to 120 minutes to release the mucoadhesive and the pharmaceutically active agents after applying the polymeric film to the eye. The dissolved polymeric film is not impeding visualization of ocular tissue while maintaining a protective film on outer surface of the eye.

10 Claims, 4 Drawing Sheets

(51) Int. Cl.
- *A61K 9/70* (2006.01)
- *A61K 31/137* (2006.01)
- *A61K 47/10* (2017.01)
- *A61K 47/32* (2006.01)
- *A61K 47/36* (2006.01)
- *A61L 26/00* (2006.01)
- *A61P 27/08* (2006.01)
- *C08L 5/08* (2006.01)
- *C08L 39/06* (2006.01)

(52) U.S. Cl.
CPC ............ *A61K 31/137* (2013.01); *A61K 47/10* (2013.01); *A61K 47/32* (2013.01); *A61K 47/36* (2013.01); *A61P 27/08* (2018.01)

(58) Field of Classification Search
CPC ..... A61K 47/36; A61P 27/08; A61L 2430/16; A61L 26/0014; A61L 26/0023; A61L 26/0052; A61L 26/0061; C08L 39/06; C08L 5/08
See application file for complete search history.

(56) References Cited

U.S. PATENT DOCUMENTS

| | | | |
|---|---|---|---|
| 8,409,606 | B2 | 4/2013 | Sawhney et al. |
| 8,459,793 | B2 | 6/2013 | De, Jr. et al. |
| 8,591,025 | B1 | 11/2013 | De Juan, Jr. et al. |
| 8,785,713 | B2 | 7/2014 | Hong et al. |
| 8,926,096 | B2 | 1/2015 | De, Jr. et al. |
| 10,039,671 | B2 | 8/2018 | de Juan, Jr. et al. |
| 2006/0036220 | A1 | 2/2006 | Kawahara et al. |
| 2008/0020025 | A1 | 1/2008 | Giles |
| 2008/0268021 | A1 | 10/2008 | Warren et al. |
| 2018/0236035 | A1* | 8/2018 | Rosa ................... A61K 35/28 |
| 2020/0061002 | A1* | 2/2020 | Horn ................... A61K 31/167 |
| 2020/0246310 | A1* | 8/2020 | Pitlick ................. A61K 31/498 |
| 2020/0345544 | A1* | 11/2020 | Ketelson ............... A61K 47/36 |
| 2021/0169781 | A1 | 6/2021 | Ketelson et al. |

OTHER PUBLICATIONS

Swanson M., "Compliance with and typical usage of artificial tears in dry eye conditions", Journal of the American Optometric Association, Oct. 1998, vol. 69, No. 10, pp. 649-655.

* cited by examiner

DISSOLVABLE MEDICAL DEVICE FOR DRUGS DELIVERY

FIELD OF THE DISCLOSURE

The present disclosure generally relates to a dissolvable medical device for placement on the outer surface (Cornea) of the eye to delivery of drug to the eye. The dissolvable medical device is a polymeric film has sufficient dimensions to substantially cover a cornea when applied to an eye and the polymeric film comprises one or more mucoadhesive polymer. The dissolvable polymeric film releases mucoadhesive polymer and drugs into the eye for an extended duration of time compared to topical drop dosage forms.

BACKGROUND

Many ophthalmic formulations comprise compounds that provide lubricity and other desirable properties. When these formulations are instilled in the eye, the properties of such compounds can prevent undesirable problems such as bio-adhesion and the formation of friction-induced tissue damage, as well as encourage the natural healing and restoration of previously damaged tissues.

Compliance with administration of topically applied ophthalmic formulations such as liquids, ointments, gels, sprays is often poor, specifically for the treatment of dry eye, allergy, infection and slowly progressing diseases, such as glaucoma, requiring multiple applications per day to lubricate and deliver a drug to the eye. Exposure to topically administered aqueous formulations is often driven by the short retention time of the formulation on the ocular surface. Paugh et al., Optom Vis Sci. 2008 August; 85(8):725-31. Typical aqueous formulations for ocular use may be diluted or washed from the ocular surface within minutes, introduce variability in the usage, or result in less accurate and precise dosages administered to the eye. Accordingly, there is a need to reduce treatment burden and improve compliance.

Ointments and gels, which are highly viscous and usually reside in the eye longer than a liquid can provide for more accurate administration. However, they can also interfere with a patient's vision and may require, at a minimum, dosing 2-3 times per day. For these and other reasons the rate of discontinuation of use can be very high. Swanson, M., J. Am. Optom. Assoc., 2011; 10:649-6.

In recent years, a wide variety of research has been carried out to develop ocular inserts useful as a dosage form for treating a variety of eye disorders. There have been many attempts to construct ocular inserts for delivering a drug over a prolonged period of time, generally hours or days to perhaps months.

LACRISERT® inserts are commercially available erodible ocular inserts that are used to treat dry eye. LACRISERT® insert is a sterile, translucent, solid rod which measures 1.27 mm in diameter and 3.5 mm in length and is made of hydroxypropyl cellulose. For administration, it is placed into the inferior cul-de-sac of the eye beneath the base of the tarsus by a patient or a medical practitioner.

However, there also are challenges in using these types of inserts. For example, LACRISERT® inserts tend to dissolve slowly and can remain in the eye even after 15-20 hours. The rod is hard and inelastic with edges due to rod-shaped design. The slow dissolving properties coupled with the rod hardness and design may lead to side effects including blurred vision, foreign body sensation and/or discomfort, ocular irritation or hyperemia, hypersensitivity, photophobia, eyelid edema, and caking or drying of viscous material on eyelashes. The most common side effect of these hydroxypropyl cellulose ophthalmic inserts is blurred vision due to the long retention time of the insert. Thus, additional approaches are needed to develop polymeric eye inserts that are comfortable and improve patient compliance.

Another medical device was developed as a corneal bandage lens to deliver drugs to the surface of the eye, following placement on the eye. The collagen shields are supplied as dehydrated films which are soaked in aqueous solutions of drugs in concentrations suitable for topical delivery just prior to their placement on the eye. Once the hydrated collagen shield is placed on the eye, it begins to break down or decompose due to contact with the enzymes in the tears on the surface of the eye. Collagen shields are manufactured from porcine or bovine collagen and three different collagen shields are currently commercially available with dissolution times of 12, 24, and 72 hours. The amount of crosslinking induced in the collagen shield by UV irradiation during manufacture determines the length of time the shield will remain intact and on the eye. In general, upon contact with enzymes that are present in the tears on the eye, the shield will begin to swell and become cloudy, resulting in a loss of transparency. The loss of transparency of the collagen shields shortly after being placed on the eye is the biggest problem with the collagen shields. Because the cloudiness interfere during the possible followed surgical procedures and impeded visualization during surgical procedures. There is also another challenge in using these types of Collagen shields. For example, the dissolution times of 12, 24, and 72 hours are too long for waiting for certain applications of the drug such as dilation agent or anesthetic agent. Despite the tremendous potential advantages of drug delivery implants, collagen shields have not been widely used in applying certain drugs to the front of the eyes.

Therefore, there are still needs for a medical device that have controllable release of a drug for a shorter dissolution time in eyes and do not impede visualization for following surgical procedures.

SUMMARY

The invention provides a dissolvable medical device for placing on the outer exposed surface of the eye to deliver a drug to the eye comprising: a polymeric film has sufficient dimensions to substantially cover a cornea when applied to an eye, wherein the polymeric film comprising one or more mucoadhesive polymers, wherein the polymeric film dissolves between 15 minutes to 120 minutes to release the mucoadhesive and the pharmaceutically active agents after applying the polymeric film to the eye, wherein a pharmaceutically active agent is added in the polymeric film during manufacturing the polymeric film or onto the polymeric film after the polymeric film is placed on the outer surface of the eye or onto the polymeric film after manufacturing but before placing on the outer surface of the eye, wherein the dissolved polymeric film is not impeding visualization of ocular tissue while maintaining a protective film on outer surface of the eye.

The present invention is partly based on the finding that problems of tending to dissolve slowly after 12-72 hours in using commercially available collagen shields and Collagen shields are also known to decrease visual acuity associated with reduced transparency/opacity of the material. The problems may be solved through using a polymeric film according to embodiments of the present disclosure which has sufficient dimensions to substantially cover a cornea when applied to an eye to allow for release of the lubricant(s) and pharmaceutically active agents to occur. The dissolvable medical device also has a thickness that is relatively comfortable for the user. A thickness is between (50 to 500 μm) 0.05 mm to 0.5 mm, a preferred thickness is between 0.10 mm to 0.3 mm, and a most preferred thickness is between 0.12 mm-0.20 mm. The target thickness is 0.12 mm for medical device dissolving in between 15 minutes to 120 minutes.

BRIEF DESCRIPTION OF THE DRAWINGS

For a more complete understanding of this disclosure, reference is now made to the following description, taken in conjunction with the accompanying drawings, in which.

DETAILED DESCRIPTION

Figure 1A:
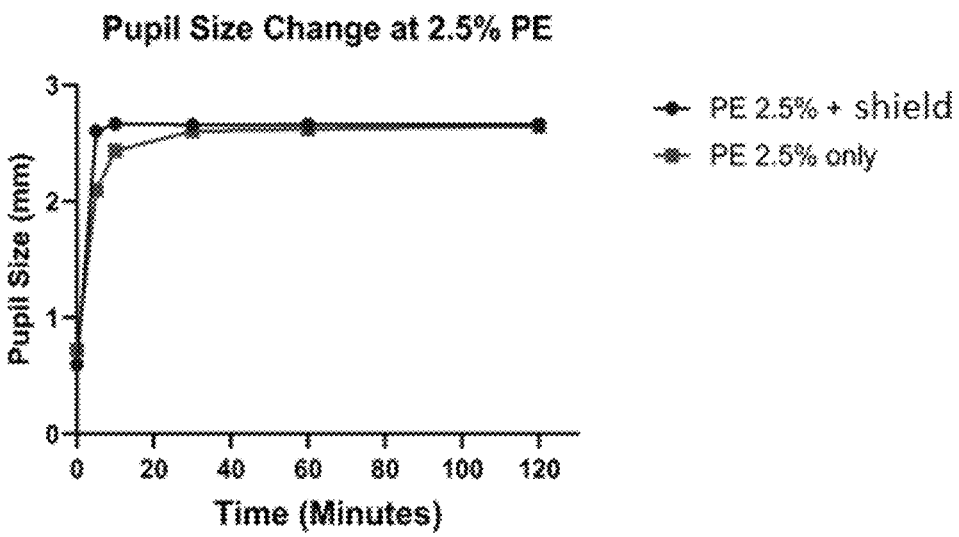
FIGS. 1A-1D illustrate response behavior of Phenylephrine delivered in the presence/absence of the polymeric film.
Figure 1B:
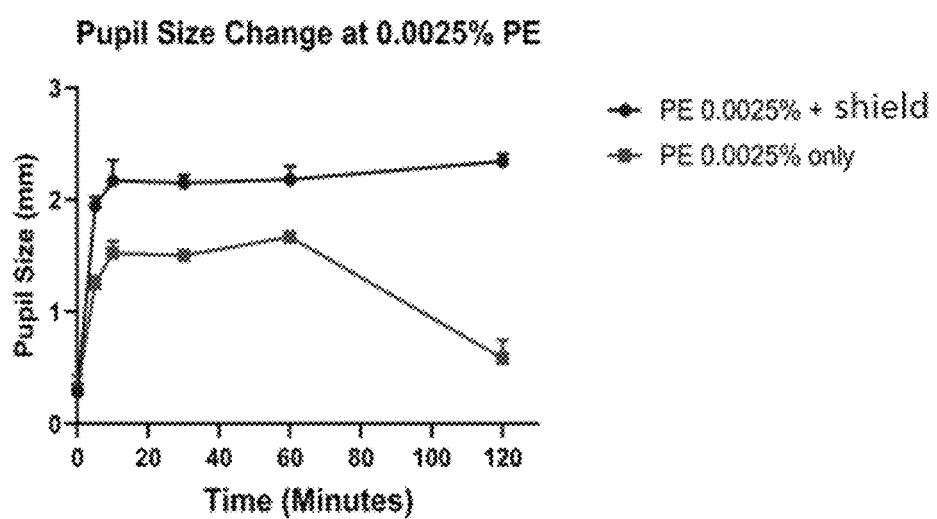
Figure 1C:
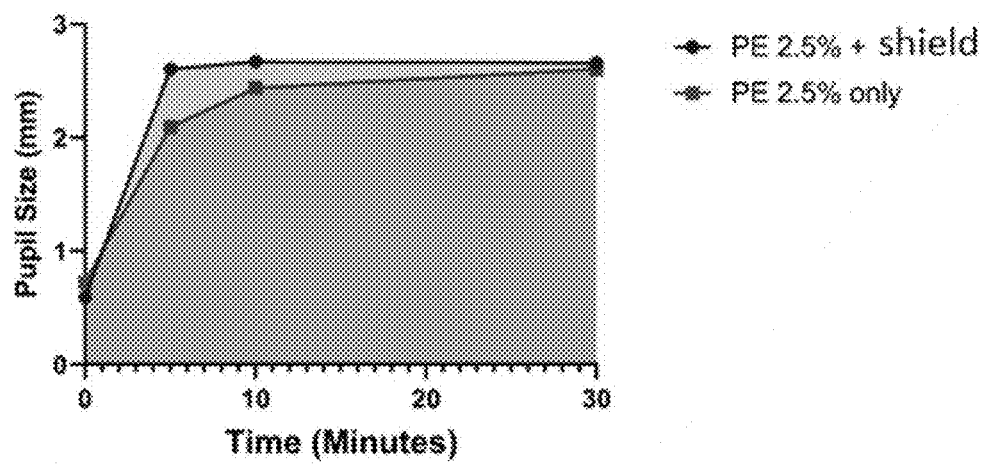
Figure 1D:
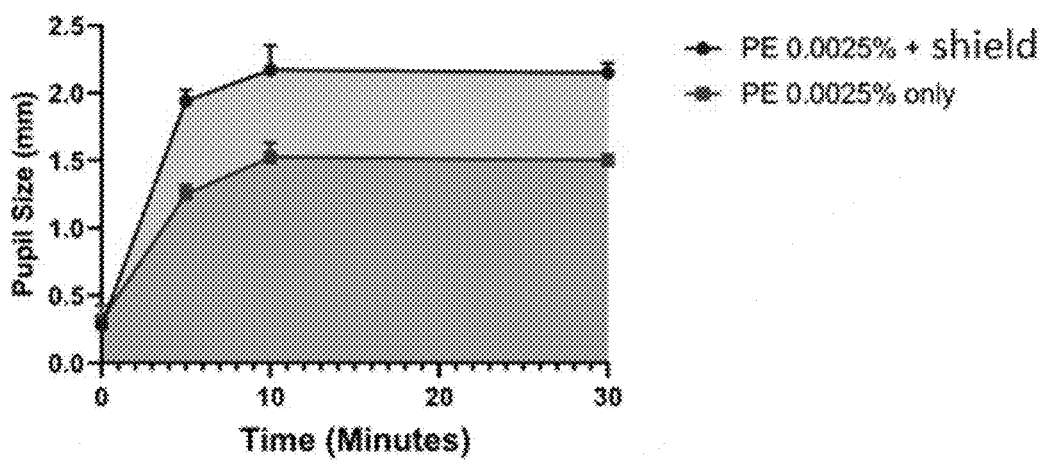

Embodiments of the present disclosure provide a dissolvable medical device for placing on the outer exposed surface of the eye to deliver a drug to the eye comprising: a polymeric film has sufficient dimensions to substantially cover a cornea when applied to an eye, wherein the polymeric film comprising one or more mucoadhesive polymers, wherein the polymeric film dissolves between 15 minutes to 120 minutes to release the mucoadhesive and the pharmaceutically active agents after applying the polymeric film to the eye, wherein a pharmaceutically active agent is added in the polymeric film during manufacturing the polymeric film or onto the polymeric film after the polymeric film is placed on the outer surface of the eye or onto the polymeric film after manufacturing but before placing on the outer surface of the eye, wherein the dissolved polymeric film is not impeding visualization of ocular tissue while maintaining a protective film on outer surface of the eye.

The biomaterial for forming a dissolvable medical device according to embodiments of the present disclosure may be comprised of one or more polymers that are biocompatible with the ocular surface and tear film. Polymers that may be used in dissolvable medical device according to embodiments of the present disclosure include, but are not limited to, hyaluronic acid (in acid or salt form), hydroxypropylmethylcellulose (HPMC), methylcellulose, tamarind seed polysaccharide (TSP), Galactomannans, for examples; guar and derivatives thereof such as hydroxypropyl guar (HP guar), scleroglucan poloxamer, poly(galacturonic) acid, sodium alginate, pectin, xanthan gum, xyloglucan gum, chitosan, sodium carboxymethylcellulose, polyvinyl alcohol, polyvinyl pyrrolidine, carbomer, polyacrylic acid and/or combinations thereof.

The preferred biocompatible polymers are hyaluronic acid, guar and derivatives and/or combinations thereof. Hyaluronic acid is an unsulphated glycosaminoglycan composed of repeating disaccharide units of N-acetylglucosamine (GlcNAc) and glucuronic acid (GlcUA) linked together by alternating beta-1,4 and beta-1,3 glycosidic bonds. Hyaluronic acid is also known as hyaluronan, hyaluronate, or HA. As used herein, the term hyaluronic acid also includes salt forms of hyaluronic acid such as sodium hyaluronate. A preferred hyaluronic acid is sodium hyaluronate. The weight average molecular weight of the hyaluronic acid used in insert of the present invention may vary, but is typically weight average of 0.75 to 5.0 M Daltons. In one embodiment, the HA has a weight average molecular weight of 0.75 to 4 M Daltons. In another embodiment, the HA has a weight average molecular weight of 1 to 4 M Daltons.

The galactomannans of the present invention may be obtained from numerous sources. Such sources include from fenugreek gum, guar gum, locust bean gum and tara gum. Additionally, the galactomannans may also be obtained by classical synthetic routes or may be obtained by chemical modification of naturally occurring galactomannans. As used herein, the term "galactomannan" refers to polysaccharides derived from the above natural gums or similar natural or synthetic gums containing mannose or galactose moieties, or both groups, as the main structural components. Preferred galactomannans of the present invention are made up of linear chains of (1-4)-.beta.-D-mannopyranosyl units with. Alpha.-D-galactopyranosyl units attached by (1-6) linkages. With the preferred galactomannans, the ratio of D-galactose to D-mannose varies, but generally will be from about 1:2 to 1:4. Galactomannans having a D-galactose:D-mannose ratio of about 1:2 are most preferred. Additionally, other chemically modified variations of the polysaccharides are also included in the "galactomannan" definition. For example, hydroxyethyl, hydroxypropyl and carboxymethyl-hydroxypropyl substitutions may be made to the galactomannans of the present invention. Non-ionic variations to the galactomannans, such as those containing alkoxy and alkyl (C1-C6) groups are particularly preferred when a soft gel is desired (e.g., hydroxylpropyl substitutions). Substitutions in the non-cis hydroxyl positions are most preferred. An example of non-ionic substitution of a galactomannan of the present invention is hydroxypropyl guar, with a molar substitution of about 0.4. Anionic substitutions may also be made to the galactomannans. Anionic substitution is particularly preferred when strongly responsive gels are desired, Preferred galactomannans of the present invention are guar and hydroxypropyl guar. Hydroxypropyl guar is particularly preferred. The weight average molecular weight of the Hydroxypropyl guar in the dissolvable medical device of the present invention may vary, but is typically but is typically 1 to 5M Daltons. In one embodiment, the Hydroxypropyl guar has a weight average molecular weight of 2 to 4 MDaltons. In another embodiment, the Hydroxypropyl guar has a weight average molecular weight of 3 to 4 M Daltons.

Polymers used in dissolvable medical devices according to embodiments of the present disclosure should be non-toxic and able to solubilize in eye fluids to ensure that the insert is eventually cleared from the eye, generally within 15 to 120-minute time frame. It should be appreciated that the polymer(s) selected should be mucoadhesive. It also should be appreciated that one or more polymers may be blended according to embodiments of the present disclosure. For example, in an embodiment of the present disclosure, hyaluronic acid (HA) may be blended with tamarind seed polysaccharide (TSP) because TSP has been shown to increase residence time of HA in aggregate blends and the blend has desired film mechanical and lubrication properties. In other embodiments of the present disclosure, as described in further detail below, hyaluronic acid may be combined with HP guar.

In some embodiments of the present disclosure, the preferred biocompatible polymers also include polyvinyl pyrrolidine (PVP). PVP is also a mucoadhesive polymer. The weight average molecular weight of the PVP in the polymeric film of the present invention may vary, but is typically 4,000 Dalton to 3 M Daltons. In one embodiment, the PVP has a weight average molecular weight of 40 K Daltons to 2 M Daltons. In another embodiment, the PVP has a weight average molecular weight of 0.5 M Daltons to 2 M Daltons.

In some embodiments of the present disclosure, a softener and/or plasticizer may be added to the one or more polymers to facilitate fabrication of a softer, malleable delivery system and also provide improved comfort in covering the cornea. A plasticizer may soften the material to provide for desirable dissolution rates. It should be appreciated softeners and/or plasticizers may be low or high-molecular weight compounds, including not limited to, polyethylene glycol (PEG) and derivatives thereof, water, Vitamin E, and triethyl citrate. The weight average molecular weight of the PEG in the polymeric film of the present invention may vary, but is typically 200 Dalton to 100,000 Daltons. In one embodiment, the PEG has a weight average molecular weight of 200 to 12000 Daltons. In another embodiment, the PEG has a weight average molecular weight of 200 to 6000 Daltons.

In some embodiments, the HP guar is present in an amount of from about 5% to about 60% w/w, preferably 15% to about 50% w/w, more preferably 25% to about 40 w/w by dry weight of the polymeric film. The PVP is present in an amount of from about 1% to about 30% w/w, preferably 5% to about 25% w/w, more preferably 10% to about 20 w/w by dry weight of the polymeric film. The hyaluronic acid (HA) is present in an amount of from about 5% to about 60% w/w, preferably 15% to about 50% w/w, more preferably 25% to about 40 w/w by dry weight of the polymeric film. The PEG is present in an amount of from about 1% to about 30% w/w, preferably 5% to about 25% w/w, more preferably 10% to about 20 w/w by dry weight of the polymeric film. According to the present application, the total amount of ingredients of the polymeric dissolvable medical devices is equal to 100% w/w.

The overall dry weight or mass of the polymeric film may be in the range of about 1 to about 12 mg, or about 2 to about 10 mg, and in particular embodiments may be from about 3 to about 9 mg.

In some embodiments, the polymeric film has a thickness of about 50-300 μm, about 120-250 μm, about 140-200 μm, or preferably about 120 μm.

In some embodiments, the polymeric film has circular shape about 2 mm to 13 mm in diameter or other shapes have the same area corresponding to circular shape about 2 mm to 13 mm in diameter. In still some embodiments, the polymeric film has a contact lens shape and prefers about 11 mm to 13 mm in diameter.

In embodiments of the present disclosure, the polymeric film include one or more additional pharmaceutically active agents. According to the present disclosure, the drug is added in the film during manufacturing the film or onto the film after the film is placed on the outer surface of the eye or onto the polymeric film after manufacturing but before placing on the outer surface of the eye. Placement a polymeric film on the outer surface of the eye according to embodiments of the present disclosure may deliver the pharmaceutically active agents before, during and after ophthalmic surgery. The dissolved polymeric film is not obstructing vision during maintaining on outer surface of the eye.

The polymeric film is used to deliver the pharmaceutically active agents before, during and after ophthalmic surgery such as glaucoma surgery, vision correction laser surgeries like laser in situ keratomileusis (LASIK) or photorefractive keratectomy (PRK) or radial keratotomy (RK) for treating refraction defects and cataract surgery.

In some embodiments, the one or more pharmaceutically active agents may be selected from the group of eye dilating agent such as Phenylephrine, ocular lubricants, antioxidants, anti-redness relievers such as alpha-2 adrenergic agonists such as brimonidine, apraclonidine etc, sympathomimetic amines such as tetrahydrozoline, naphazoline, TRPM8 agonists such as menthol, menthol analogs, steroids and non-steroidal anti-inflammatory agents to relieve ocular pain and inflammation, antibiotics, anti-histamines such as olopatadine, anti-virals, antibiotics and anti-bacterials for infectious conjunctivitis, anti-muscarinics such as atropine and derivatives thereof for myopia treatment, and glaucoma drug delivery such as prostaglandin and prostaglandin analogs such as travoprost, or therapeutically suitable combinations thereof.

Polymeric film according to embodiments of the present disclosure may be made using various processing techniques, including but not limited to, compression molding and solution casting.

The polymeric film of the present disclosure are a platform to deliver pharmaceutically active agents to treat ocular surface disease, before, during or post eye surgery. In some embodiments, the polymeric film can be used to prolong exposure of pharmaceutically active agents or provide extended drug delivery of pharmaceutically active agents to the eye. Thus, in some embodiments, the present disclosure provides a method of providing extended drug delivery or prolonging exposure of a pharmaceutically active agent to the eye, by administering a polymeric film including the pharmaceutically active agent (drugs) to a patient in need thereof. The drug is added in the film during manufacturing the film or onto the film after the film is placed on the outer surface of the eye or onto the film after manufacturing but before placing on the outer surface of the eye.

The following non-limiting Examples are provided to illustrate embodiments of the invention.

EXAMPLES

Procedure below on how to manufacture and cast corneal shields. Slight variations in volume casted and drying times based on corneal shield thickness (I to Ill). Target thickness is ~120 microns).

Example I

Procedure to Make 90-120 Micron Thickness Dry Films

Part 1: Procedure to prepare 850 g stock solution of the formulation (HA 40%/HPGuar 40%/PVP 10%/PEG 10%) at 0.85 g/100 mL concentration in order to make dry films of 90-120 micron thickness:

850 mL of distilled water were placed in a 1 L Erlenmeyer flask followed by the addition of Hyaluronic acid and PVP. The flask was placed in a sonicator and an overhead mechanical stirrer was set up. The mixture was sonicated and stirrer until a viscous, clear and homogeneous solution was obtained (90±30 minutes). The speed of the mechanical stirrer was adjusted to 450±50 rpm. HPGuar was added and the mixture was sonicated and stirred for another 90±30 minutes. To the clear, viscous and homogeneous solution, PEG 400 was added. The mixture was sonicated and stirred for 30 minutes. The mechanical stirring was then stopped and the sonication was allowed to continue for an additional 30 minutes in order to release all bubbles.

Film Casting Procedure:

For the preparation of the films, a petri dish (150 mm diameter×20 mm height) was filled with 200 g±10 g of the stock solution and placed in the evaporation oven.

The oven is equipped with an exhaust fan to move 110 cfm of air. The temperature inside the oven was controlled at 25±3° C. during the evaporation process.

After 40-48 hours of evaporation, the petri dish was taken out of the oven and placed into a plastic zipped bag overnight. The film was then peeled out and kept in a plastic zipped bag at room temperature.

Example 2

Procedure to Make 140-170 Micron Thickness Dry Films

Part 1: Procedure to prepare 800 g stock solution of the formulation (HA 40%/HPGuar 40%/PVP 10%/PEG 10%) at 0.85 g/100 mL concentration in order to make dry films of 140-170 micron thickness:

800 mL of distilled water were placed in a 1 L Erlenmeyer flask followed by the addition of Hyaluronic acid and PVP. The flask was placed in a sonicator and an overhead mechanical stirrer was set up. The mixture was sonicated and stirrer until a viscous, clear and homogeneous solution was obtained (90±30 minutes). The speed of the mechanical stirrer was adjusted to 450±50 rpm. HPGuar was added and the mixture was sonicated and stirred for another 90±30 minutes. To the clear, viscous and homogeneous solution, PEG 400 was added. The mixture was sonicated and stirred for 30 minutes. The mechanical stirring was then stopped and the sonication was allowed to continue for an additional 30 minutes in order to release all bubbles.

Film Casting Procedure:

For the preparation of the films, 1) A 1 L beaker was filled with 500 g±10 g of the stock solution and placed in the evaporation oven to reduce the volume to ½ with magnetic stirring. This step takes two days. 2) A petri dish (150 mm diameter×25 mm height) was filled with 270 g±30 g of the concentrated stock solution and placed in the evaporation oven.

The oven is equipped with an exhaust fan to move 110 cfm of air. The temperature inside the oven was controlled at 25±3° C. during the evaporation process.

After 2-3 days of evaporation, the petri dish was taken out of the oven and placed into a plastic zipped bag overnight. The film was then peeled out and kept in a plastic zipped bag at room temperature.

Example 3

Procedure to Make 180-230 Micron Thickness Dry Films

Part 1: Procedure to prepare 800 g stock solution of the formulation (HA 40%/HPGuar 40%/PVP 10%/PEG 10%) at 0.85 g/100 mL concentration in order to make dry films of 180-230 micron thickness:

800 mL of distilled water were placed in a 1 L Erlenmeyer flask followed by the addition of Hyaluronic acid and PVP. The flask was placed in a sonicator and an overhead mechanical stirrer was set up. The mixture was sonicated and stirrer until a viscous, clear and homogeneous solution was obtained (90±30 minutes). The speed of the mechanical stirrer was adjusted to 450±50 rpm. HPGuar was added and the mixture was sonicated and stirred for another 90±30 minutes. To the clear, viscous and homogeneous solution, PEG 400 was added. The mixture was sonicated and stirred for 30 minutes. The mechanical stirring was then stopped and the sonication was allowed to continue for an additional 30 minutes in order to release all bubbles.

Film Casting Procedure:

For the preparation of the films, 1) A 1 L beaker was filled with 750 g±20 g of the stock solution and placed in the evaporation oven to reduce the volume to ½ with magnetic stirring. This step takes two-three days. 2) A petri dish (150 mm diameter×25 mm height) was filled with 300 g±30 g of the concentrated stock solution and placed in the evaporation oven.

The oven is equipped with an exhaust fan to move 110 cfm of air. The temperature inside the oven was controlled at 25±3° C. during the evaporation process.

After 3-4 days of evaporation, the petri dish was taken out of the oven and placed into a plastic zipped bag overnight. The film was then peeled out and kept in a plastic zipped bag at room temperature.

Example 4

In the groups with such treatments, a 0.1-0.2 g lens was applied to the center of the cornea. 1 drop of dilating agent (phenylephrine) of predetermined concentration was applied at t(0). Size of pupil was measured using a pre-measured device for reference and followed up using the same scale.

FIGS. 1a, 1b, 1c and 1d illustrates that opportunity to under dose when co-delivered with the polymeric film. In addition, based on data, 0.005% phenylephrine when delivered with a polymeric film could achieve similar efficacy to 2.5% phenylephrine alone with a 500-fold reduced drug load.

Study the Response Behavior of Phenylephrine Delivered in the Presence/Absence of the Polymeric Film

| STUDY DESIGN | | | | |
|---|---|---|---|---|
| | | Treatment | | |
| Category | Group | Shield | Dilation Agent | Outcome |
| A | A1 | No | PE 2.5% | 1. Time to maximal dilation (min) |
| | A2 | Yes | PE 2.5% | |
| B | B1 | No | PE 0.0025% | 2. Time at maximal dilation (min) |
| | B2 | Yes | PE 0.0025% | |
| | | | | 3. Maximal dilation (mm) |

| METHODOLOGY |
|---|
| Shield applied to the center of the cornea |
| 1 drop of dilating agent applied (t = 0) |
| Size of pupil measured using a pre-measured device for reference |

Opportunity to under dose when co-delivered with the corneal shield

Based on data, 0.005% phenylephrine when delivered with a corneal shield could achieve similar efficacy to 2.5% phenylephrine alone with a 500-fold reduced drug load Example 5

In order to determine whether the polymeric film causes mechanical impediment to standard surgical procedures. The shield was applied on the eye of an anesthetized mouse and allowed to dissolve for 5 minutes. After that, the mouse was euthanized and 3 standard ocular surgical techniques were applied. The first was a corneal incision mimicking that of the clean corneal incisions used in cataract surgery. Then, a small needle was inserted in the incision and fluid was injected in simulating the injection of viscoelastic in multiple ocular surgeries. Lastly, a micro-scissor was used to cut around the cornea using different incisions. During all 3 procedures, no added resistance was noted.

Figure 2A:
FIGS. 2A-2C illustrate the impact of the polymeric film on surgical procedures.
Figure 2B:
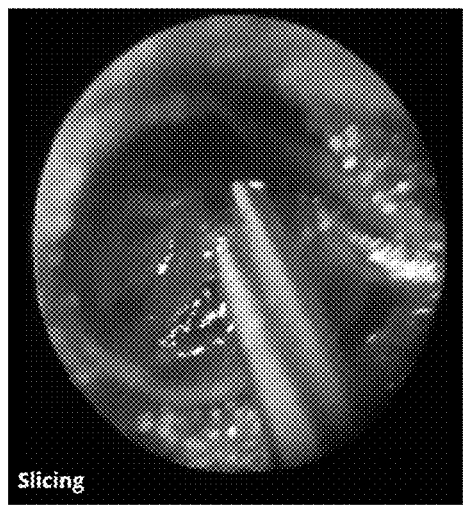
Figure 2C:
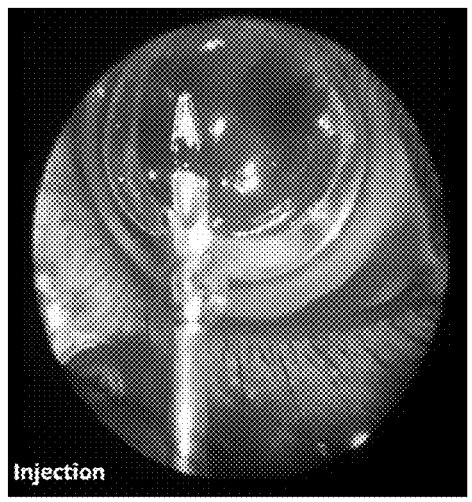

FIGS. 2A, 2B and 2C illustrates that the polymeric film does not negatively impact surgical procedure such as making incisions, injections and/or slicing of the cornea.

Example 6

In order to test whether the shield impedes visualization of the posterior eye, a shield was applied on a euthanized mouse and allowed to dissolve for 5 minutes. After that, a 90 D lens was used to visualize the posterior eye. This allowed seeing into the eye and visualizing the optic nerve and the retina.

Figure 3A:
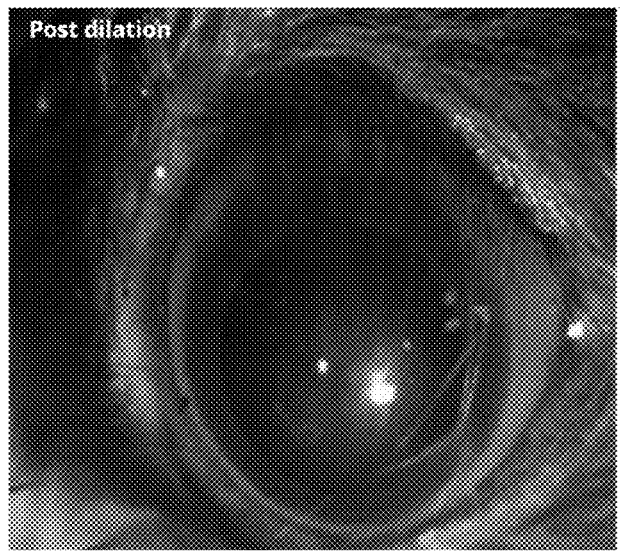
FIGS. 3A-3B illustrate the impact of the polymeric film on visualization during a simulated surgery.
Figure 3B:

FIGS. 3A and 3B illustrates that the polymeric film does not impair visualization of retina/retinal hallmarks

The invention claimed is:

1. A dissolvable medical device for placing on the outer exposed surface of the eye to deliver a drug to the eye comprising: a polymeric film has sufficient dimensions to cover a cornea when applied to an eye, wherein the polymeric film is circular and has a diameter 11 mm to 13 mm and a thickness 120 um-250 um, wherein the polymeric film comprising one or more mucoadhesive polymers, wherein the one or more mucoadhesive polymers are hydroxypropyl guar (HP guar), hyaluronic acid, or sodium hyaluronate or polyvinyl pyrrolidine or combinations thereof, wherein the polymeric film dissolves between 15 minutes to 120 minutes to release the mucoadhesive and the pharmaceutically active agents after applying the polymeric film to the eye, wherein a pharmaceutically active agent is added in the polymeric film during manufacturing the polymeric film or onto the polymeric film after the polymeric film is placed on the outer surface of the eye or onto the polymeric film after manufacturing but before placing on the outer surface of the eye, wherein the dissolved polymeric film is not impeding visualization of ocular tissue while maintaining a protective film on outer surface of the eye, wherein the pharmaceutically active agent is phenylephrine, wherein the dissolvable medical device comprising 0.0025% w/w to 2.5% w/w of phenylephrine, wherein comparing to apply the same amount of the phenylephrine to the cornea and wait for exact 10 minutes to measure, a pupil is dilated to a bigger size when the phenylephrine is delivered in the presence of the polymeric film than in the absence of the polymeric film.

2. The dissolvable medical device of claim 1, wherein the one or more
mucoadhesive polymers are present in an amount of at least 5% w/w HP guar, at least 5% w/w hyaluronic acid, at least 5% w/w polyvinyl pyrrolidine by dry weight of the polymeric film and a total amount of mucoadhesive polymers is equal to or less than 100% w/w by dry weight of the polymeric film.

3. The dissolvable medical device of claim 1 further comprising a plasticizer or softener.

4. The dissolvable medical device of claim 3 wherein the plasticizer or softener is selected from the group consisting of: polyethylene glycol (PEG), a PEG derivative, water, Vitamin E, and triethyl citrate.

5. The dissolvable medical device claim 3, wherein the plasticizer or softener is present in an amount of from about 2% to about 30% w/w, about 5% to about 25% w/w, about 5% to about 20% w/w, or about 5% to about 15% w/w of the polymeric film by dry weight of the polymeric film and a total amount of mucoadhesive polymers and the plasticizer or softener is equal to or less than 100% w/w by dry weight of the polymeric film.

6. The dissolvable medical device of claim 4, wherein the plasticizer or softener is PEG.

7. The dissolvable medical device of claim 1, wherein the insert is comprised of approximately 40% HP guar, approximately 10% PVP, approximately 40% sodium hyaluronate, and approximately 10% PEG.

8. The dissolvable medical device of claim 1, wherein the polymeric film is placed on the outer surface of the eye to delivery of pharmaceutically active agent to the eye before, during or post ophthalmic surgery.

9. The dissolvable medical device of claim 8, wherein ophthalmic surgery is selected from a group of glaucoma surgery, vision correction laser surgeries and cataract surgery.

10. The dissolvable medical device of claim 9, wherein vision correction laser surgeries is selected from a group of laser in situ keratomileusis (LASIK), photorefractive keratectomy (PRK) and radial keratotomy (RK) for treating refraction defects.

* * * * *